US008655713B2

(12) United States Patent
Green et al.

(10) Patent No.: US 8,655,713 B2
(45) Date of Patent: Feb. 18, 2014

(54) TECHNIQUES FOR HELP DESK MANAGEMENT

(75) Inventors: Tammy Anita Green, Provo, UT (US); Stephen R Carter, Spanish Fork, UT (US); Scott Alan Isaacson, Woodland Hills, UT (US); Eric Anderson, Alpine, UT (US)

(73) Assignee: Novell, Inc., Provo, UT (US)

( * ) Notice: Subject to any disclaimer, the term of this patent is extended or adjusted under 35 U.S.C. 154(b) by 754 days.

(21) Appl. No.: 12/259,460

(22) Filed: Oct. 28, 2008

(65) Prior Publication Data

US 2010/0106542 A1      Apr. 29, 2010

(51) Int. Cl.
G06Q 40/00 (2012.01)
G06Q 10/00 (2012.01)
G06Q 10/10 (2012.01)
G06Q 30/02 (2012.01)
G06Q 10/06 (2012.01)

(52) U.S. Cl.
CPC .......... *G06Q 40/00* (2013.01); *G06Q 10/06395* (2013.01); *G06Q 10/10* (2013.01); *G06Q 30/02* (2013.01); *G06Q 30/0203* (2013.01)
USPC .......................... 705/7.41; 705/7.32; 709/219

(58) Field of Classification Search
CPC ....... G06Q 40/00; G06Q 10/00; G06Q 10/10; G06Q 10/06395; G06Q 30/02; G06Q 30/0203
USPC ................. 705/7, 10, 11, 7.41, 7.32; 709/219
See application file for complete search history.

(56) References Cited

U.S. PATENT DOCUMENTS

| 6,230,287 | B1 | 5/2001 | Pinard et al. |
| 6,236,975 | B1 * | 5/2001 | Boe et al. ...................... 705/7.32 |
| 6,327,579 | B1 | 12/2001 | Crawford |
| 6,970,831 | B1 * | 11/2005 | Anderson et al. ............ 705/7.32 |
| 7,281,170 | B2 | 10/2007 | Taylor et al. |
| 7,412,402 | B2 * | 8/2008 | Cooper ......................... 705/7.42 |
| 7,778,862 | B2 * | 8/2010 | Vaccarelli et al. ............ 705/7.32 |
| 2002/0009190 | A1 * | 1/2002 | McIllwaine et al. ..... 379/265.06 |
| 2002/0128898 | A1 * | 9/2002 | Smith et al. ...................... 705/10 |
| 2002/0152110 | A1 * | 10/2002 | Stewart et al. .................. 705/10 |
| 2003/0105659 | A1 * | 6/2003 | Eisenstein ...................... 705/10 |
| 2003/0140031 | A1 | 7/2003 | Thomas et al. |
| 2003/0172133 | A1 * | 9/2003 | Smith et al. .................... 709/219 |
| 2006/0229054 | A1 | 10/2006 | Erola et al. |
| 2007/0271111 | A1 * | 11/2007 | Dubinsky ........................... 705/1 |
| 2008/0208644 | A1 * | 8/2008 | Gray et al. ........................ 705/7 |
| 2008/0228580 | A1 * | 9/2008 | Korman et al. .................. 705/14 |

FOREIGN PATENT DOCUMENTS

EP      1536622 A1 *   1/2005   ............ H04M 3/428

OTHER PUBLICATIONS

Szymanski, Jacek; "An integrated information infrastructure for pre-clinical research-IT support"; 2008; p. 1.*

* cited by examiner

*Primary Examiner* — Ella Colbert

(74) *Attorney, Agent, or Firm* — Schwegman Lundberg & Woessner, P.A.

(57) ABSTRACT

Techniques for help desk management are provided. A user's experience with a resource is captured via a rating. The rating is recorded along with other metrics associated with a processing environment of the user and proactive action taken in response to configuration or performance problems with the user.

6 Claims, 3 Drawing Sheets

TECHNIQUES FOR HELP DESK MANAGEMENT

BACKGROUND

During the regular course of using electronic and networked assets or an enterprise, a user may often experience a wide spectrum of satisfaction with using those assets.

For example, a Virtual Private Network (VPN) that the user may be connected through via an enterprise firewall may be experiencing problems, which results in slower than normal response times. In another example, a router may fail causing network traffic to be rerouted through other routers, which causes traffic patterns that in turn alter network response times experienced by the network users. In still another case, a user may experience memory problems on a local processing platform, which results in poor performance.

In each case, the user is only aware of response times being slower than normal, or even response times that are unacceptable.

In many situations, the user may ignore slow response times and fault the enterprise with which the user is interacting with. This can be devastating to the enterprise because the issue is never reported to the enterprise for remedy. However, it may actually be an issue with the user's environment and not the fault of an enterprise asset.

In other cases, the user either picks up the phone and calls a help desk or enters into an online chat with a help desk regarding the issue the user is experiencing with an asset. Here, a variety of manual processes can result in much information being lost or misidentified. Furthermore, the user may give up while waiting for a help desk person to interact with them regarding the problem. Still further, many help desk personnel are now outsourced and may not adequately speak the native language of the user. All these things influence reporting and resolving problems for a user and also result in user frustration, which can negatively impact the business of an enterprise.

Still further, other uses may be experiencing a same or similar issue, which when the help desk addresses results in duplicative work whereas if the users were properly grouped from the start the problem may have been better isolated and addressed more quickly.

Thus, improved techniques for help desk administration are needed.

SUMMARY

In various embodiments, techniques for help desk management are provided. More specifically, and in an embodiment, a method is provided for help desk administration. A questionnaire is activated and is presented to a user. A rating is received from and assigned by the user in response to the questionnaire. The rating is a value assigned by the user and represents an opinion that the user has with respect to a quality of service that the user experienced with a particular resource. The rating, resource identity for the resource, and user identity for the user are recorded for subsequent action and analysis.

DETAILED DESCRIPTION

Figure 1:
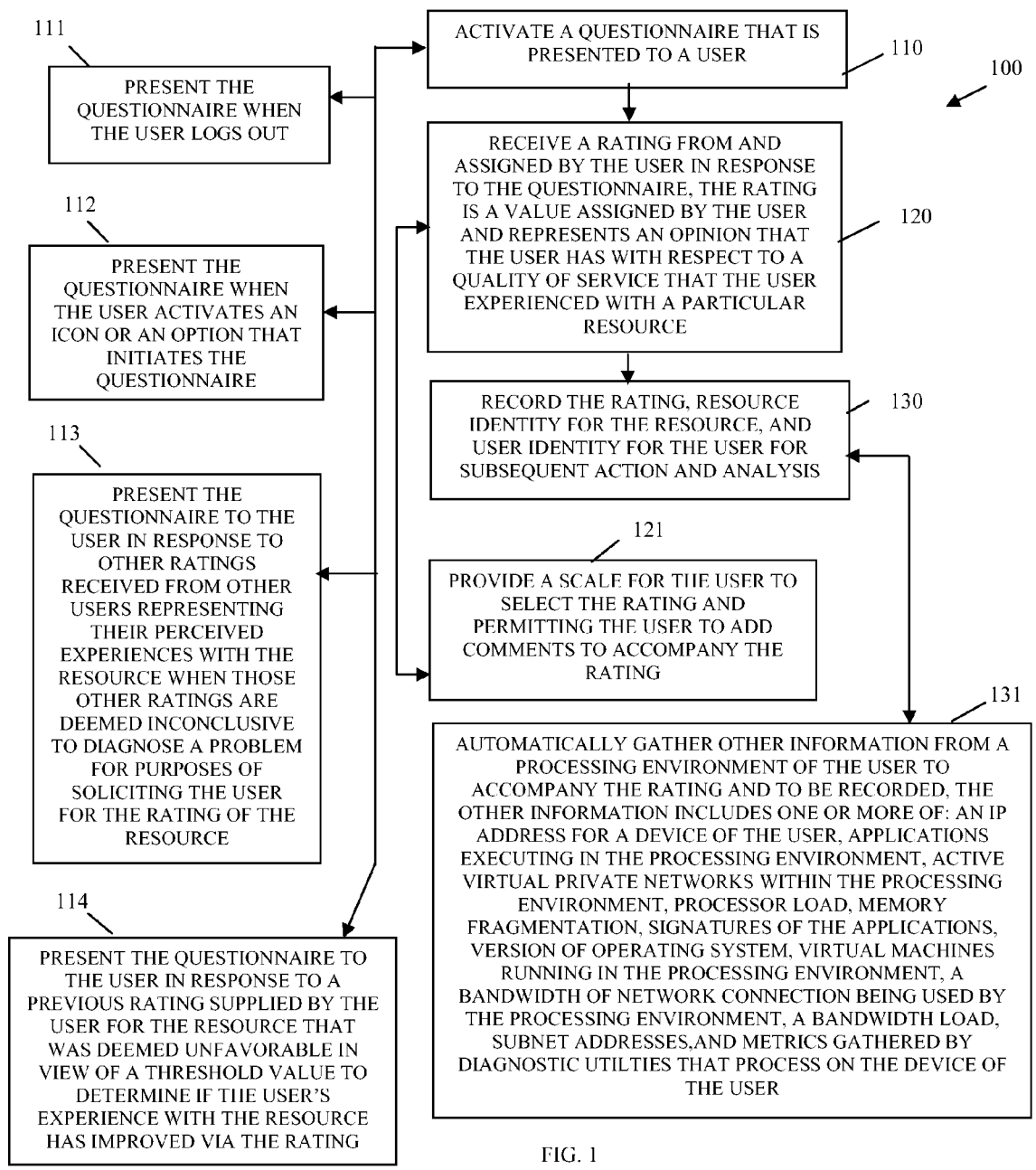
FIG. 1 is a diagram of a method for help desk administration, according to an example embodiment.

A "resource" includes a user, content, a processing device, a node, a service, an application, a system, a directory, a data store, groups of users, combinations of these things, etc. Resources can interact with each other and can either act on other resource or be acted upon by other resources. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) or a wide-area network (WAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for help desk administration, according to an example embodiment. The method 100 (hereinafter "help desk management service") is implemented as instructions in a machine-accessible and computer-readable storage medium. The instructions when executed by a machine (computer or processor-enabled device) perform the processing depicted in FIG. 1. The help desk management service is also operational over and processes within a network. The network may be wired, wireless, or a combination of wired and wireless.

At 110, the help desk management service activates a questionnaire that is presented to a user. The questionnaire itself is provided via a user interface (UI) mechanism, such as an icon or context menu within a World-Wide Web (WWW) browser or on a desktop of a user's client device. The purpose of the questionnaire is to gauge the user's perceived satisfaction when interacting with a resource or suite or resources. The timing and contents of the questionnaire can vary as can when the questionnaire is presented to the user.

For example, at 111, the help desk management service presents the questionnaire when the user logs out of a service (type of resource), a network (such as an enterprise Intranet or Virtual Private Network (VPN)), and/or logs out of a desktop client or Virtual Machine (VM).

In another case, at 112, the help desk management service presents the questionnaire when the user activates an icon or an option that initiates the questionnaire. Here, the user directly and affirmatively decides in an unsolicited manner to access the questionnaire by activating an icon or context menu option.

In still another situation, at 113, the help desk management service presents the questionnaire in response to other ratings received from other users. These other ratings represent the other users' perceived experiences with the resource. This is done when the other ratings are deemed inconclusive to diagnose a problem. Thus, the help desk management service can solicit the user to address the questionnaire; this is done when the help desk management service determines more information is needed or values the input from the user. That is, the user may be one that has been known to supply valuable comments in diagnosing previous issues, so the user is selected to answer the questionnaire. It may also be that the user has a similar processing environment to the other users and the help desk management service is attempting to determine whether a potential problem with the resource is widespread or more localized.

In another case, at 114, the help desk management service presents the questionnaire to the user in response to a previous rating that the user supplied for the resource. Here, the previous rating may be deemed unfavorable in view of some threshold level of predefined acceptability. This is done to determine if the user's experience with the resource has improved since the last time the user accessed the resource.

At 120, the help desk management service receives a rating from and assigned by the user in response to the questionnaire. The rating is a value assigned by the user and represents an opinion of that the user has with respect to a quality of service that the user experienced with a particular resource.

It is noted, that the rating is opinion because it may be something is amiss with the user's processing environment or configuration and the resource may be just fine. The user is not aware of what the issue is; only that the user is experiencing some performance related issue and the user detects it while accessing the resource. The opinion is presented as a selection to the user along a predefined scale, such as 0-10, with 0 being horrible or unusable and 10 being tremendous. It is noted that any predefined scale that is objective in nature and which permits a user to subjectively make an assignment for the rating can be used with embodiments of this invention. Also, the rating may have a dual meaning, such as how bad a particular service is performing and the impact to the users' job/department business. A dollar value may also be used to indicate the impact to the business.

As an example associated with the processing of 110-120 consider that a user is provided with some UI (icon or context menu option within an application or WWW browser). The UI is part of the help desk management service or interfaced to the help desk management service and allows the user to specify a satisfaction rating (the rating) concerning computing resources of an enterprise. For example, when the UI is activated it can provide the user with a list of ratings and labels defining what each rating means, such as 1 for the network is slow; 2 for the network seems to be fine but the user's system is slow; 3 for the application I am using is slow; 4 for logging on was slow; 5 for the user's email is slow. In another case, the UI is a set of sliders from 1 to 10, which are next to categories for different resources, such as the network as a whole, the system as a whole, an application, logging on to the system or network, and/or the email. The user slides the control to indicate a range of satisfaction ratings concerning the current experience.

So, in a particular case, at 121, the help desk management service provides a scale for the user to select the rating and permits the user to add comments to accompany the rating.

Thus, a user can also, in some situations, comment on prior activation. For example, if the user had indicated slow network response times for the resource that was experienced 20 minutes prior and is activating the resource a second time one of the categories associated with the rating and provided within the questionnaire can state: "earlier you ranked the resource access as N, has this now improved?"

At 130, the help desk management service records the rating, a resource identity for the resource, and a user identity for the user in a repository (directory, database, file, data warehouse, etc.) for subsequent help desk action and analysis.

In an embodiment, at 131, the help desk management service automatically gathers other information from a processing environment of the user. This other information accompanies the rating and is also recorded. Some of the other information can include but is not limited to one or more of the following: an IP address for a device of the user, application identifiers for applications executing in the processing environment, active VPN's within the processing environment, processor load for a device of the user, memory fragmentation metrics, signatures of applications, a version of the operating system, VM's running in the processing environment, bandwidth of a network connection being used by the processing environment, bandwidth load, and subnet addresses and information.

In some embodiments, a user configuration setting may prevent the extra gathering of information as described in the embodiment of 131. That is, for privacy reasons some or all of the additional information that is gathered by the help desk management service may be prevented based on user profile or user direction for purposes of maintaining a certain degree of user privacy that the user desires.

Also, under particular circumstances, also at 131, the information can be collected using another service that is separate and independent from the help desk management service. For example, if a network problem is suspected, but appears to be isolated to a particular subnet, the help desk management service can have a particular application or applications downloaded and/or executed to acquire more detailed diagnostics, via more detailed diagnostic utilities. These applications can run on the users machines associated with the subnet issue. Some example applications/utilities can include ping, trace-route, and/or any custom-built test suite. The data produced by these utilities can also be processed and analyzed directly on the user machines (e.g., did the ping operation fail, etc.) to provide a summary back to the help desk management service or the raw data that the utilities produce can be transmitted back to the help desk management service.

The questionnaire is customizable and can be dynamically customized based on the history of the user, resource, and/or present conditions of the network as a whole. Multiple different resources can also be addressed, as was partially discussed above. The ratings of the questionnaire can also include detailed messages and labels to guide the user in selecting a rating. Still further, the questionnaire can accept user comments in the language and format desired by the user.

The help desk management service has focused on presenting an unobtrusive questionnaire that is customized and dynamic in nature to a user for purposes of gathering the perceived experience that the user has with that resource. The user rating can be enhanced with objective information such as system information discussed above and include other more subjective information, such as user comments. All this information is housed in a repository and used in manners discussed more completely herein and below for purposes of providing proactive help desk management for an enterprise.

Figure 2:
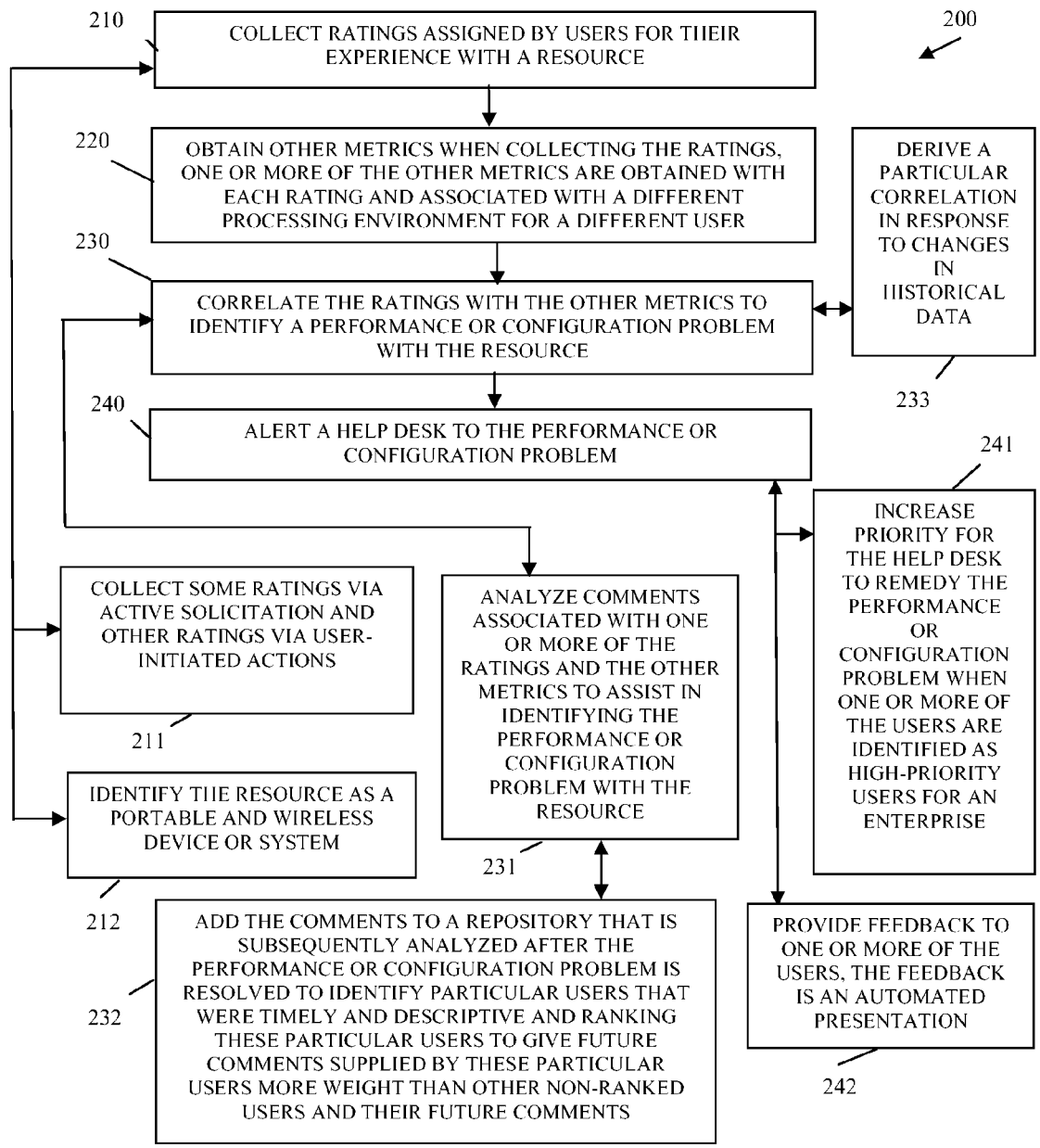
FIG. 2 is a diagram of another method for help desk administration, according to an example embodiment.

FIG. 2 is a diagram of another method 200 for help desk administration, according to an example embodiment. The method 200 (hereinafter "problem rating and resolution service" is implemented in a machine-accessible and readable medium as instructions. The instructions when executed by a machine perform the processing depicted in the FIG. 2. Moreover, the problem rating and resolution service is operational over a network, and the network may be wired, wireless, or a combination of wired and wireless.

The problem rating and resolution service presents another in some cases enhanced perspective to the help desk management service represented by the method 100 of the FIG. 1.

At 210, the problem rating and resolution service collects ratings assigned by users for their experience with a resource.

According to an embodiment, at 211, the problem rating and resolution service collects at least some ratings via an active solicitation of the users, such as when other users are experiencing issues with the resource and the problem rating and resolution service is attempting to see how widespread the issue is or such as when a particular user is known to be a good and objective source of ratings for resources of an enterprise. Also, the problem rating and resolution service can collect other ratings via user-initiated actions that are unsolicited. These scenarios were discussed above with reference to the method 100 of the FIG. 1.

In an embodiment, at 212, the problem rating and resolution service identifies the resource as a portable and wireless device or system. In other words, the resource can be a variety of devices, such as a cell phone, a security system to a building or home, a garage door or entry system. In this manner, the help desk via the problem rating and resolution service can manage resources that are not directly under their control and can report any issues discovered to the responsible parties. So, in some situations it may be that the resource is a cloud resource being supplied over the Internet and still the user can supply ratings and feedback on that cloud resource, such that should the problem rating and resolution service diagnose a problem with the cloud resource, a cloud provider can be notified or the user can be instructed to contact that cloud provider for resolution.

At 220, the problem rating and resolution service obtains other metrics when collecting the ratings. One or more of the other metrics are obtained with each rating and associated with a different processing environment for a different one of the users.

For example, the problem rating and resolution service can gather processing environment information (e.g., subnet, applications being run, active VPN's, processor load, memory fragmentation, etc.) with the rating. Comments can also be acquired with the rating. This information assists in the correlation processing at 130. For example, a comment on slow network access (resource is network as a whole) states that a particular user is running a particular VPN and other VPN users are also commenting (but not all of them) that network access is slow. Here, the VPN subnet or access point is automatically identified as being the same for all the commenting users. In such a case, the problem rating and resolution service can send an alert to display or popup on a screen of help desk personnel stating that a specific VPN server may be experiencing performance issues. This prompts an interrogation of the VPN in question and actions are taken to remedy the situation. Here, the user that initially commented was totally unaware of the real cause of the problem related to a slow network connection, which turned out to be a particular VPN server. So, correlation with other users' comments and ratings assist in finding underlying causes of problems or issues with enterprise resources.

Accordingly, at 230, the problem rating and resolution service correlates the ratings with other metrics to identify a performance or configuration problem with the resource. Again this can be done in a variety of manners.

For example, at 231, the problem rating and resolution service also analyzes comments associated with one or more of the ratings and the other metrics to assist in identifying the performance or configuration problem with the resource.

Continuing with the embodiment at 231 and at 232, the problem rating and resolution service adds the comments to a repository that is subsequently analyzed after the performance or configuration problem is resolved to identify particular users that were timely and descriptive. These users can then be ranked to give any future comments supplied by these particular users more weight than other non-ranked or lower-ranked users and those lower-ranked users' comments.

In some cases, the information received via the ratings, comments, and metrics may still not be enough to correlate and find the problem with the resource. So, an unsolicited (discussed above with reference to the method 100 of the FIG. 1) request (such as dynamically generated and customized questionnaire) is sent to other network or system users. This is done to proactively request comment on the overall performance of the resource. This unsolicited request is confined to users that are likely or probable to give insight to the resource issue being investigated. Thus, in the example provided above, a particular VPN server was in distress, in this situation a note is made that not all VPN users are presently unhappy with the VPN access response times. A query to other user systems, which are utilizing the same subnet, is interrogated and their responses show that a router servicing part of the subnet is potentially failing.

According to an embodiment, comments from the users can include collaboration activities, which access Internet cloud resources. The problem rating and resolution service requests user comments from the cloud to be shared with the help desk so that issues that are remote from the enterprise systems can be identified and the user notified that the problem is not solvable by the enterprise help desk. So, the user is advised that help should be sought from cloud administrators to resolve the problem.

Similarly, resources like cell phone access (via a wireless cell phone carrier), door entry systems, etc. are available for comment and can be correlated for remediation. This was also discussed above with reference to the method 100 of the FIG. 1. For example, comments that cell service is poor can be forwarded to a cell phone provider along with information that would allow the cell phone provider to resolve the issues.

Also, the metrics can include information that can be used to identify a resource that is in distress because of component failure, virus infection, etc. For example, a resource signature may reveal a virus.

In some cases, at 233, correlations can be deduced or derived from changes noticed in historical data. For example, ratings for a particular service may have previously shown normal ratings for a previous week, but on day 8, the ratings decreased by 10% and then held steady for another full week, and then finally at day 16, the ratings decreased by yet another 25% and continued to drop 1% per day thereafter. Correlating current data with the historical data can indicate that a problem is worsening and needs immediate attention.

At 240, the problem rating and resolution service alerts a help desk to the performance or configuration problem with the resource. This can be achieved in a variety of manners, such as posting to a help desk website, popup messages on help desk screens, emails, automated pages, automated voice messages, and/or all or various combinations of these things. The alerts to the help desk can be sent in a periodic and continuous updated manner to a status display using a summary presentation to show changes over time.

In an embodiment, at 241, the problem rating and resolution service increases the help desk's priority for remediation of the performance or configuration problem when one or more of the users are identified as high-priority users. So, a list of users can be maintained and should one of these users providing a negative rating and/or comment the remediation priority is advanced automatically. Some such users that may accelerate priority within an enterprise include a CEO, CFO, CIO, or major client/customer of an enterprise, and the like.

According to an embodiment, at 242, the problem rating and resolution service also provides feedback to one or more of the users. The feedback is an automated presentation that provides such things as summary totals for the ratings, a specific identification of the performance or configuration problem, and/or a current status and/or schedule for addressing that performance or configuration problem by the help desk. Feedback can be provided via the same interface that the user accessed to provide the rating or can be provided in a variety of other different manners, such as via a website link, via an email, via an email with the website link, via a popup message, and the like.

For example, the user receives feedback from the problem rating and resolution service such that the user is able to see an indication of the activities being pursued by the help desk to resolve a particular problem or even comment. So, activating the rating/comment UI of the problem rating and resolution service after a previous rating/comment on a particular resource can show a status, such as "52 email users of sever S are experiencing slow access and I/T is currently investigating. Such a feature can substantially reduce help desk phone and email messages by proactively letting the users know the issue is being addressed.

Figure 3:
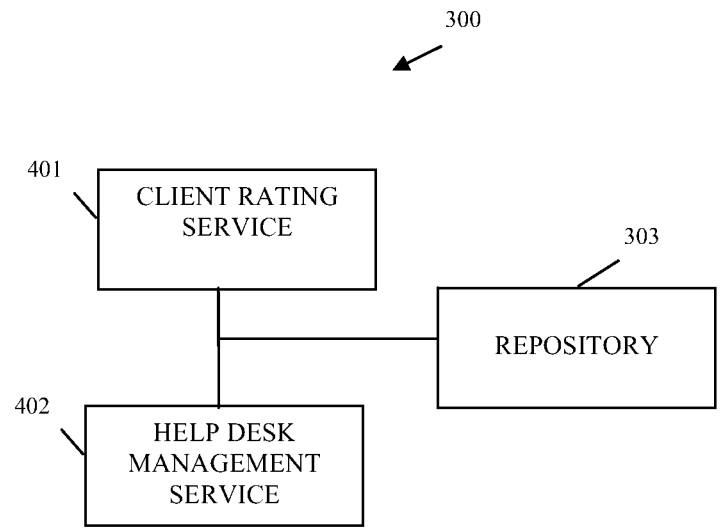
FIG. 3 is a diagram of help desk administration system, according to an example embodiment.

FIG. 3 is a diagram of help desk administration system 300, according to an example embodiment. The help desk administration system 300 is implemented in a machine-accessible and readable medium as instructions. The instructions when executed by a machine (computer or processor-enabled device) perform the processing depicted in the FIGS. 1 and 2. Moreover, the help desk administration system 300 is operational over a network, and the network may be wired, wireless, or a combination of wired and wireless.

The help desk administration system a client rating service 301 and a help desk management service 302. In some instances, the help desk administration system 300 also includes a repository 303. Each of these and their interactions with one another will now be discussed in turn.

The client rating service 301 is implemented in a computer-readable storage medium as instructions that process on client (computer or processor-enabled device) of a user. Example processing associated with the client rating service 301 was presented above with reference to the methods 100 and 200 of the FIGS. 1 and 2, respectively.

The client rating service 301 acquires a rating for an experience that a user has with respect to a resource. This is done from the point-of-view of the user. The rating is supplied over the network to the help desk management service 302.

According to an embodiment, the client rating service 301 is initially activated based on direct user action that is unsolicited.

In another case, the client rating service 301 is initially activated by the help desk management service 302 to solicit the rating.

The help desk management service 302 is implemented in a computer-readable storage medium as instructions that process on a server (computer or processor enabled device). Example processing associated with the help desk management service 302 was presented above with reference to the methods 100 and 200 of the FIGS. 1 and 2, respectively.

The help desk management service 302 records the rating and proactively discovers a performance or configuration problem with the resource when the rating is correlated with other ratings from other users of the network and with other metrics collected with the rating and the other ratings.

In an embodiment, the help desk management service 302 alerts help desk personnel to the performance or configuration problem. Alternatively, the help desk management service 302 automatically fixes or notifies the user on how to fix the performance or configuration problem. That is, standard scripts for known problems can be automatically initiated to resolve some of the problems.

In an embodiment, the help desk administration system 300 also includes a repository 303. The repository 303 is implemented in a computer-readable storage medium and is accessible to the client rating service 301 and the help desk management service 302. The repository 303 may also include network configurations, VM activations, cluster statuses, etc. so that the client rating service 301 may attempt to isolate the issue (e.g., to a particular router rather than a VPN server, etc.).

The repository 303 houses the ratings, the other ratings, and the metrics. It also houses comments associated with the ratings. So, the client rating service 301 can collect comments from the user with the rating and the comments are housed in the repository 301 with the rating to which they relate, the other ratings, and the metrics.

Retention of this information in the repository 303 permits a variety of beneficial features. For example, a history of comments and responses can be evaluated to detect regular failures that may be the result of improperly configured resources or under powered resources. The history of comments in the repository 303 can also be evaluated or mined to identify users that provide comments that are more useful than other users. So, users that are timely and provide more detail or correct detail can be graded or ranked.

Figure 4:
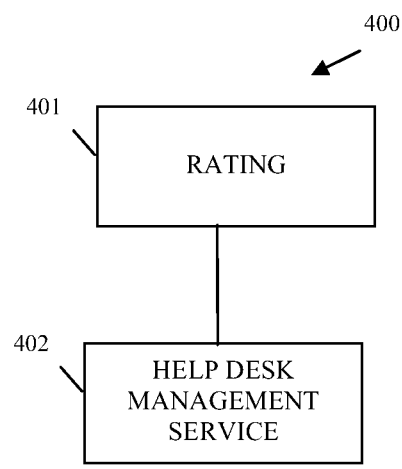
FIG. 4 is a diagram of another help desk administration system according to an example embodiment.

FIG. 4 is a diagram of another help desk administration system 400 according to an example embodiment. The help desk administration system 400 is implemented as instructions on or within a machine-accessible and computer-readable storage medium. The instructions when executed by one or more machines (computer(s) or processor-enabled device(s)) perform various aspects of the processing depicted with respect to the methods 100 and 200 of the FIGS. 1 and 2, respectively; and the system 300 of the FIG. 3. The help desk administration system 400 is also operational over a network and the network may be wired, wireless, or a combination of wired and wireless.

The help desk administration system 400 includes a rating 401 and help desk management service 402. Each of these components and their interactions with one another will now be discussed in turn.

The rating 401 is implemented in a computer-readable storage medium as instructions and is to be processed by the help desk management service 402. Example aspects of the rating 401 were presented above in detail with reference to the methods 100 and 200 of the FIGS. 1 and 2, respectively, and with respect to the system 300 of the FIG. 3.

The rating 401 is an objective and quantified value that is supplied by a user with respect to that user's perceived experience with a resource. The scale and labels associated with the quantified values are customizable. So, in an example a scale of 1-10 can be used and each rating value (1-10) includes a descriptive text to assist the user in assigning the rating 401. The rating is sent to the help desk management service 402.

In an embodiment, the rating 401 is unsolicited by the help desk management service 402.

In another case, the rating 401 is actively solicited by the help desk management service 402 in response to the other ratings from the other users or in response to a pattern detected with the resource by the help desk management service 402.

The help desk management service 402 is implemented in a computer-readable storage medium as instructions that process on a machine (computer or processor enabled device) over a network. Example aspects of the help desk management service 402 were presented in detail above with reference to the methods 100 and 200 of the FIGS. 1 and 2, respectively, and with respect to the system 300 of the FIG. 3.

The help desk management service 402 receives the rating 401 from a user's processing environment and correlates that rating 401 with other ratings 401 culled from other users and their experiences with the resource. In response to this correlation, one or more proactive actions are taken by a help desk.

In an embodiment, the one or more proactive actions are assigned a processing priority in response to an identity associated with the user, in response to an identity for the resource, and/or in response to a volume (total number) associated with the other ratings received from the other users.

In a particular situation, the help desk management service 402 uses an identity for the resource, the rating, the other ratings for the resource, metrics collected with the rating and the other ratings, and comments collected with the rating and the other ratings to mine for or discover a pattern. The pattern is associated with a pre-defined configuration problem associated with or related to the resource. The pattern can also be used to detect hardware issues, network issues, and/or software issues.

For example, if one user reports a 0 (0 being really bad, 10 being really good) and all other users report 10 then this not only shows where the problem is but it can also indicate that there is a low probability of a "global problem." Consider again, that if some users report 3 or 4 but not all do, this shows some possible "local problems" occurring with the reporting users. Also, if all users report a 2 and not a 10, this may actually show a significant global problem. If this idea was encapsulated for a particular "market" or a "product" as a whole one could show the urgency of a problem by its "value." A few high bids are one bit of info and many low bids are another; so, price and volume and direction are important pieces of information that can be represented for any desired market.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented using instructions that are stored in a non-transitory computer-readable storage medium and executed by a processor-enabled device, comprising:

activating, by the processor-enabled device, a questionnaire that is presented to a user and dynamically customizing the questionnaire based on a history for the user, a computing resource for which the questionnaire is being directed, and present conditions for a network as a whole, the user activates the questionnaire as a user interface by activating an icon presented to the user, the timing as to when the questionnaire is activated can vary as can the time as to when the questionnaire is actually presented to the user via the icon provided in the user interface;

receiving, by the processor-enabled device, a rating from and assigned by the user in response to the questionnaire, wherein the rating is a value assigned by the user and represents an opinion that the user has with respect to a quality of service that the user experienced with the computing resource, the rating includes a dual value for the quality of service and a dollar value for impact of the quality of service on a business, the value assigned by the user via the user accessing a set of sliders from the user interface, each slider for providing a particular value via sliding that slider to a particular number for a particular category associated with the computing resource; and recording, by the processor-enabled device, the rating and resource identity for the computing resource for subsequent action and analysis and gathering other information for the subsequent action and analysis from a processing environment of the user using a service that is separate and independent from the method to maintain privacy of the user from the method.

2. The method of claim 1, wherein activating further includes presenting the questionnaire when the user logs out.

3. The method of claim 1, wherein activating further includes presenting the questionnaire to the user in response to other ratings received from other users representing their perceived experiences with the computing resource when those other ratings are deemed inconclusive to diagnose a problem for purposes of soliciting the user for the rating of the computing resource.

4. The method of claim 1, wherein activating further includes presenting the questionnaire to the user in response to a previous rating supplied by the user for the computing resource that was deemed unfavorable in view of a threshold value to determine if the user's experience with the computing resource has improved via the rating.

5. The method of claim 1, wherein receiving further includes providing a scale for the user to select the rating and permitting the user to add comments to accompany the rating.

6. The method of claim 1, wherein recording further includes automatically gathering the other information from the processing environment of the user to accompany the rating and to be recorded, wherein the other information includes one or more of: an Internet Protocol (IP) address for a device of the user, applications executing in the processing environment, active virtual private networks within the processing environment, processor load, memory fragmentation, signatures of the applications, a version of operating system, virtual machines running in the processing environment, a bandwidth of network connection being used by the processing environment, a bandwidth load, subnet addresses, and metrics gathered by diagnostic utilities that process directly on the device of the user.

* * * * *